United States Patent [19]

Chowdhuri

[11] 3,793,535
[45] Feb. 19, 1974

[54] CIRCUIT FOR PROTECTING SEMICONDUCTORS AGAINST TRANSIENT VOLTAGES

[75] Inventor: Pritindra Chowdhuri, North East, Pa.

[73] Assignee: General Electric Company, Erie, Pa.

[22] Filed: Dec. 6, 1972

[21] Appl. No.: 312,742

[52] U.S. Cl.................... 307/202, 307/93, 317/70
[51] Int. Cl. ......................................... H03k 17/00
[58] Field of Search 307/202, 93; 317/31, 33, 33 C, 317/70

[56] References Cited
UNITED STATES PATENTS

| 2,789,254 | 4/1957 | Bodle et al.................. 317/33 R X |
| 3,047,746 | 7/1962 | Berkery ................................ 307/93 |
| 3,084,647 | 6/1963 | Ferrin .................................. 317/31 |

Primary Examiner—Rudolph V. Rolinec
Assistant Examiner—B. P. Davis
Attorney, Agent, or Firm—Dana F. Bigelow; Walter C. Bernkopf

[57] ABSTRACT

A surge protector is connected in parallel across each of the line-side and load-side circuits, that on the line-side having a relatively high clipping voltage and relatively high energy handling capability, and that at the load-side having a lower clipping voltage and lower energy handling capability. An LC-network is connected between the surge protectors to slope off the incoming transient voltage so that the line-side protector initiates the clipping action before the load-side protector starts to clip the voltage. The line-side protector dissipates most of the transient energy and the load-side protector clips the voltage to the required level.

4 Claims, 3 Drawing Figures

CIRCUIT FOR PROTECTING SEMICONDUCTORS AGAINST TRANSIENT VOLTAGES

BACKGROUND OF THE INVENTION

This invention relates generally to circuit protective devices and more particularly to techniques for protecting semiconductor devices from transient voltage surges.

External transients may be caused by direct strokes of lightning or by induced lightning overvoltages. The more frequent source of externally generated transients, however, is caused by switching functions associated with the power system itself. In any case, the externally generated transient overvoltages are random and unpredictable and may subject a low voltage system to overvoltages of very high magnitude.

Internally generated transients result from switching and commutation, the former being random and unpredictable, and the latter being repetitive and cyclic.

It is generally known that protective devices may be effectively switched into a circuit in response to a transient overvoltage so as to protect a load in the circuit, and subsequently switched out within a reasonably short period to resume normal circuit operation. Protection of a system against transient overvoltages by surge protectors requires that these protectors be able to reduce the transient overvoltage to a safe value well below the breakdown voltage of the devices without causing a system outage. To this end, various techniques have been devised for effective circuit protection of electrical systems. However, the use of these techniques cannot always be utilized to protect systems containing semiconductor devices. A semiconductor device is permanently damaged under a transient overvoltage if either the applied voltage exceeds its breakdown voltage or if the energy content of the applied voltage is higher than the withstand capability of the device.

Passive systems such as RC- and LC-networks have been effectively used in the past, and in many applications are still a reliable means for transient protection. However, as the power handling capacity of systems containing semiconductor devices is substantially increasing, the efficiency of the passive network is questionable.

A typical transient voltage protector for a-c systems comprises a calibrated gap in series with a non-linear resistor, the combination being connected across the apparatus to be protected. The calibrated gap breaks over if the magnitude of the transient voltage exceeds a certain level, thus reducing the voltage across the apparatus. In accordance with Paschen's law, above a critical value of gap length, the breakdown voltage decreases with diminishing gap length, whereas below the critical value it increases with decreasing gap length. If the withstand capability of the load lies below this lowest critical breakdown voltage, as do many of the systems containing semiconductor devices, then the protector is not suitable for use with such a device.

Where power is drawn from a-c secondary systems a lightning arrestor of the thyrite or pellet type may be adequate for circuit protection. But where the power input is d-c current, as for example in transit cars, these arrestors are not applicable. For such applications, capacitor type d-c arrestors are adequate to divert the major portion of the energy in the transient voltage, but the level of the voltage reduced would still be high enough to cause damage to semiconductor devices in the system.

In general, a protective device is comprised of a switching means connected in series with an energy dissipating means. The primary function of the switching means is to prevent continuous power loss in the energy dissipating means during normal operation of the system and to switch on at the lowest transient voltage level possible in the shortest possible time. The primary function of the energy dissipating means is to dissipate the transient energy without damage to itself. The overall function of the protective device is to keep the clipping voltage level below the transient-voltage withstand capability of the apparatus or system to be protected and to be able to dissipate the energy contained in the transient without any deleterious effects.

Therefore, the two most important requirements of a surge protector are: clipping voltage level and energy handling capability. Commercially available surge protectors generally do not combine low clipping voltage level with high energy handling capability. They have either low clipping voltage and low energy handling capability or high clipping voltage and high energy handling capability. This is not suitable for protection of semiconductor devices against transient voltages.

It is therefore an object of this invention to provide an overvoltage protection system suitable for suppressing both internal and external transients.

Another object of this invention is the provision for protecting a circuit with semiconductor devices from damage resulting from transient overvoltages.

Yet another object of this invention is the provision for a circuit protector device having a lower voltage limiting characteristic than the withstand capability of the associated protected apparatus.

Still another object of this invention is the provision for a protector device which "switches on" in response to a transient overvoltage so that the protected apparatus is not stressed beyond a safe value.

Still another object of this invention is the provision for a circuit protective apparatus which is economical to construct and effective in use.

These objects and other features and advantages become more readily apparent upon reference to the following description when taken in conjunction with the appended drawings.

SUMMARY OF THE INVENTION

In accordance with one aspect of the invention a pair of surge protectors are coupled in parallel between the line-side and the load-side of a circuit with an LC-network coupled therebetween. The protector at the line-side has relatively high clipping voltage and relatively high energy handling capability whereas that at the load-side has lower clipping voltage and lower energy handling capability. The LC-circuit slopes off or delays the rise time of the oncoming transient and forces the line-side protector to trigger first thus dissipating most of the energy of the surge. The load-side protector is switched on at a later time and dissipates the rest of the energy contained in the surge. Thus the line-side protector dissipates most of the transient energy whereas the load-side protector clips the voltage to the required level. The clipping voltage level of the load-side protector is chosen such that the transient voltage penetrating into the apparatus or system to be protected will be below the withstand capability of the apparatus or system.

The LC-network, in addition to introducing a delay, will take care of short spikes and filter out harmonics generated either externally or internally by the load. Since it is non-dissipative in nature, it will not interfere with the steady-state operation of the system. In many applications, the LC-network will already be present as a design requirement to function as a filter. In these cases, the line-side and load-side protectors have to be added to the system.

In the drawings as hereinafter described a preferred embodiment is depicted; however, various other modifications and alternate constructions can be made thereto without departing from the true spirit and scope of the invention.

DESCRIPTION OF THE PREFERRED EMBODIMENT

Figure 1:
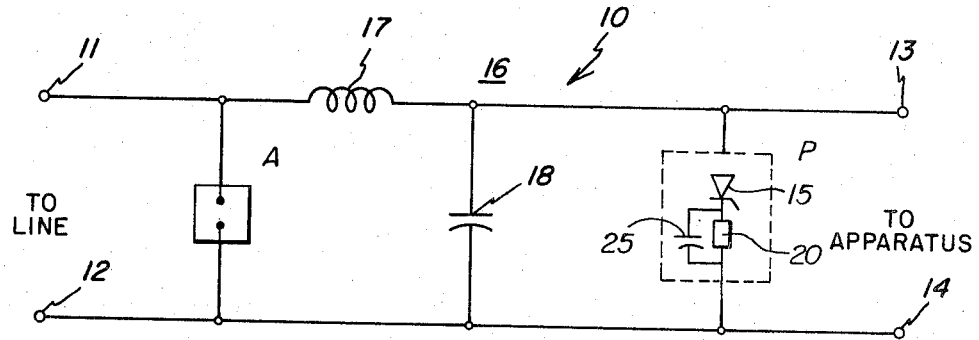
FIG. 1 is a schematic diagram of the preferred embodiment of this invention.

Referring now to FIG. 1, the protective circuit is shown generally at 10 and has input terminals 11 and 12 and output terminals 13 and 14. The input terminals are connected to a power source (not shown) of either the a-c or the d-c type, and are susceptible to internal transient voltages which may result from either internal switching or from commutation. The commutation transients are repetitive and cyclic and can be protected against by various techniques, as for example, a capacitor in series with a thyrector, or an RC-network with a diode shorting the resistor in the charging direction. The switching transients on the other hand, which are random and unpredictable, are more difficult to protect against. They may be generated by any of a number of conditions and may be of very high magnitude.

In addition to the aforesaid internal transients the terminal 11 and 12 may also be susceptible to external transients. Electric locomotives and rapid transit systems are typical of systems which are so exposed. The external sources include lightning, which may enter the system either directly or inductively, and the more common source of switching associated with the power system. The externally generated transient overvoltages are random and unpredictable, and may be of a very high magnitude and energy level.

Connected to the output terminals 13 and 14 of the subject circuit is an apparatus (not shown) which may be damaged by the aforesaid transient voltages unless suitable protection is provided. Of particular relevance to this invention is the apparatus of the type containing semiconductor devices, wherein the steady-state voltage utilized is of a relatively low magnitude and wherein the devices have a very limited capability for withstanding transient voltages.

A semiconductor device of the type contemplated may be permanently damaged under a transient overvoltage if the applied voltage exceeds its breakover voltage or if the energy content thereof is higher than the withstand capability of the device. The components of the protection circuit 10 are thus preferably chosen to provide that degree of protection commensurate with the capabilities of the apparatus connected to outlet terminals 13 and 14.

Coupled across the input terminals 11 and 12 is an arrestor A of a type commercially available, and having a relatively high clipping voltage and a relatively high energy handling capabilty. A typical arrestor, as stated before, is comprised of a switching means connected in series with an energy dissipating means. The switching means, in this case, may be a calibrated gap as shown in FIG. 1 which may also serve as an energy dissipating means. It can also be a controllable semiconductor device, such as a thyristor (U.S. Pat. No. 3,405,284 issued on Oct. 8, 1968) or any other suitable means. The energy dissipating means may be a thyrite, thyrector or metal oxide varistor (MOV) or any other non-linear resistor. The criteria of such an arrestor should be such that its clipping voltage has the lowest level which is compatible with the steady-state system voltage and which is capable of dissipating the required transient energy. In many applications, the switching means of the arrestor may not be necessary. In these cases, the arrestor A is comprised solely of an energy dissipating means. The criteria, then, should be such that the discharge voltage across the energy dissipating means caused by the flow of transient current has the lowest possible level compatible with the minimum steady-state energy loss and which is capable of dissipating the required transient energy.

Even though the arrestor, A, is designed to dissipate the major portion of the transient energy, its clipping voltage is relatively high and the level of the voltage reduced thereby remains high enough to cause damage to semiconductors in the apparatus to be protected. A second protector device P is thus connected across the circuit output terminals 13 and 14. Its characteristics are such that it has a low clipping voltage and a low energy handling capability, its clipping voltage being compatible with the transient-voltage withstand capability of the apparatus to be protected. The embodiment of the protector device P may be similar to that of the arrestor A with suitable design of the required parameters. A typical design as shown by FIG. 1 uses a thyristor 15 to switch in a thyrite 20 having a capacitor 25 connected thereacross. Similar to the protector A various other designs and modifications can be used as hereinbefore discussed. The protector device P will, in addition, act to suppress internal switching transients of lower energy content.

In order to delay application of the transient surge to the second protector device P, a choke input filter 16 is connected between the two protectors A and P. The purpose of the choke input filter 16 is to slope off or delay the incoming transient voltage so that the arrestor A initiates the clipping action before the protector, P, starts to clip the voltage. The protector P is thus isolated from the higher voltages, and when subsequently switched on, acts to further limit these surges to a level compatible with the withstand capability of the semiconductor devices.

The choke input filter 16 is preferably of the LC-type wherein an inductor 17 is coupled in series between the line and the apparatus and a capacitor 18 is coupled in parallel therewith. High impedance elements are undesirable since they tend to interfere with the normal operation of the system. For example, if resistors are placed in the circuit they will dissipate steady-state voltage drop and may interfere with the steady-state operation of the system. The LC-circuit, being non-dissipative in nature will allow normal steady-state operation of the system and also will serve to filter out harmonics. It should be noted that multi-stage as well as single stage filters may be used.

Figure 2:
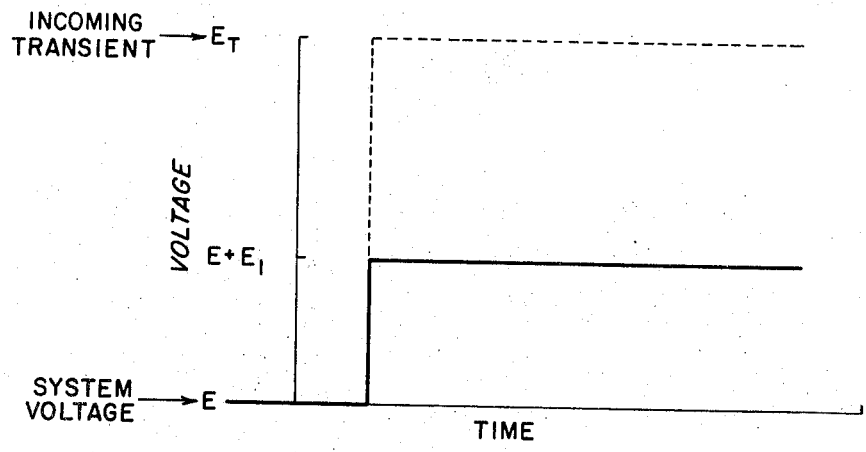
FIG. 2 is a graphic illustration of the voltage-time relationship of the circuit as modified by the switching-on of a first protector device.
Figure 3:
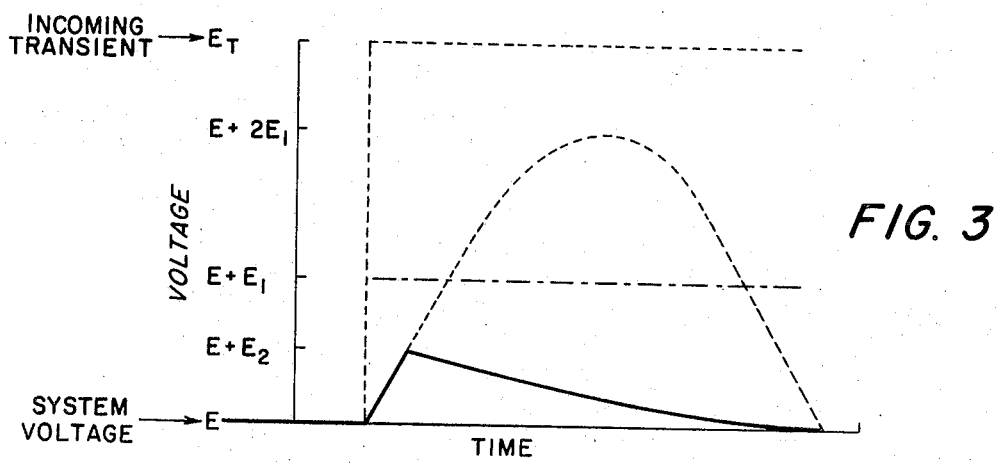
FIG. 3 is a graphic illustration thereof as further modified by the switching-on of a second protector device.

To illustrate the operation of the circuit as contemplated, reference is made to FIGS. 2 and 3 wherein a transient voltage surge $E_T$ is received from the line which normally carries a steady-state voltage E. When the transient voltage reaches the arrestor A, much of the energy is dissipated and the level of the voltage is reduced to $E + E_1$. For a rectangular voltage wave of magnitude $E_1$ at the input of the filter 16, a voltage wave of magnitude $E_c$ will appear across the capacitor 18, where $E_c = E + E_1(1 - \cos t/\sqrt{LC})$. Without the protector P, the voltage $E_c$ may reach a magnitude of $E + 2E_1$. Such a rise may occur for example, when a long surge is received so as to cause the inductor 17 to resonate and double the voltage. This would be far in excess of the safe limits of the apparatus. The protector P is thus triggered at a clipping voltage level of $E + E_2$ so as to dissipate additional energy and limit that transient voltage penetrating into the apparatus to $E + E_2$ which is below the withstand capability of the apparatus.

What I claim as new and desire to secure by Letters Patent of the United States is:

1. An overvoltage protective circuit having input terminals for connection to a power source which produces occasional transient voltage surges and output terminals for connection to a load having components incompatible with the voltage and power levels of the surges comprising:

a. a first energy dissipative means connected in parallel across the input terminals, said dissipation means being so constructed as to have a relatively high clipping voltage level to substantially dissipate the energy level of the transient surges from the input terminals and to allow the remaining transient energy to be passed to a second dissipative means;

b. a second energy dissipative means connected in parallel across the output terminals to receive said remaining transient energy, said second means being so constructed as to have a relatively low clipping voltage level below that of the transient-voltage withstand-capability of the load to dissipate a substantial amount of said remaining transient energy; and c. a delay-network connected between said first and second energy dissipative means for providing a delay and slope to any transient voltage received at said first means, so that when a transient surge occurs said first means triggers and limits the transient voltage and energy before said second means can reach its clipping voltage.

2. A protective circuit as set forth in claim 1 wherein said delay network comprises an LC-network with an inductance in series between said input and output terminals and a capacitance in parallel therewith.

3. A protective circuit as set forth in claim 1 and including a first switching means in series with said first energy dissipative means, said first switching means being responsive to close when the amplitude of the voltage surges reaches a predetermined magnitude and to open when the magnitude is reduced therebelow.

4. A protective circuit as set forth in claim 1 and including a second switching means in series with said second energy dissipative means, said second switching means being responsive to close when the amplitude of the voltage received reaches a predetermined magnitude and to open when the magnitude is reduced therebelow.

* * * * *